(12) United States Patent
Oberzaucher et al.

(10) Patent No.: US 11,626,792 B2
(45) Date of Patent: Apr. 11, 2023

(54) INVERTER WITH MONITORING UNIT FOR INTERMEDIATE CIRCUIT PROTECTION

(71) Applicant: Fronius International GmbH, Pettenbach (AT)

(72) Inventors: Friedrich Oberzaucher, Pettenbach (AT); Gerhard Wallisch, Pettenbach (AT); Joachim Danmayr, Pettenbach (AT); Andreas Luger, Pettenbach (AT)

(73) Assignee: Fronius International GmbH, Pettenbach (AT)

( * ) Notice: Subject to any disclaimer, the term of this patent is extended or adjusted under 35 U.S.C. 154(b) by 0 days.

(21) Appl. No.: 17/258,526

(22) PCT Filed: Jul. 30, 2019

(86) PCT No.: PCT/EP2019/070441
§ 371 (c)(1),
(2) Date: Jan. 7, 2021

(87) PCT Pub. No.: WO2020/025585
PCT Pub. Date: Feb. 6, 2020

(65) Prior Publication Data
US 2021/0143729 A1    May 13, 2021

(30) Foreign Application Priority Data
Jul. 30, 2018   (EP) .................................. 18186354

(51) Int. Cl.
*H02M 1/32*       (2007.01)
*H02M 3/155*      (2006.01)
(Continued)

(52) U.S. Cl.
CPC ............. *H02M 1/32* (2013.01); *H02M 3/155* (2013.01); *H02M 7/44* (2013.01); *H02M 7/48* (2013.01);
(Continued)

(58) Field of Classification Search
CPC ...... H02M 1/32; H02M 3/155; H02M 7/4833; H02M 7/4835; H02M 3/156; H02M 1/007
See application file for complete search history.

(56) References Cited

U.S. PATENT DOCUMENTS 5,729,098 A * 3/1998 Konopka ............... H05B 41/28
                                                    315/307
6,031,738 A * 2/2000 Lipo ..................... H02M 7/487
                                                    363/43
(Continued)

FOREIGN PATENT DOCUMENTS

DE       102013114271 A1    6/2015
EP         1 858 148 A1    11/2007
(Continued)

OTHER PUBLICATIONS

International Search Report corresponding to International application No. PCT/EP2019/070441, dated Nov. 28, 2019 (14 pages).

*Primary Examiner* — Yusef A Ahmed
(74) *Attorney, Agent, or Firm* — Maginot, Moore & Beck LLP

(57) ABSTRACT

An inverter includes a DC/DC converter which converts a direct current received from a DC voltage source into an intermediate circuit voltage of an intermediate circuit, a DC/AC converter which converts the intermediate circuit voltage into an AC voltage, and a monitoring unit which monitors capacitors of the intermediate circuit for protection against overvoltages. If an overvoltage occurs at one of the capacitors of the intermediate circuit the overvoltage unit decouples the DC voltage source from the intermediate circuit by actuating the DC/DC converter.

11 Claims, 3 Drawing Sheets

(51) Int. Cl.
*H02M 7/44* (2006.01)
*H02M 7/48* (2007.01)
*H02M 7/483* (2007.01)
*H02M 3/156* (2006.01)

(52) U.S. Cl.
CPC ....... *H02M 7/4833* (2021.05); *H02M 7/4835* (2021.05); *H02M 3/156* (2013.01)

(56) References Cited

U.S. PATENT DOCUMENTS

| | | | | |
|---|---|---|---|---|
| 8,253,424 B2* | 8/2012 | Wolf | ...................... | G01R 31/64 324/519 |
| 8,975,899 B2* | 3/2015 | Wolf | ...................... | H02J 3/381 324/519 |
| 9,520,800 B2* | 12/2016 | Tian | ...................... | H02M 7/4833 |
| 9,812,986 B2* | 11/2017 | Hong | ...................... | H02J 7/487 |
| 9,997,996 B1* | 6/2018 | Halberstadt | ............... | G05F 1/62 |
| 10,541,539 B1* | 1/2020 | Miyake | ............... | H02M 7/062 |
| 2003/0107349 A1* | 6/2003 | Haydock | ............... | H02M 5/458 322/28 |
| 2004/0252533 A1* | 12/2004 | Eguchi | ............... | H02M 7/53803 363/97 |
| 2005/0068001 A1* | 3/2005 | Skaug | ............... | H02M 7/53873 318/807 |
| 2007/0291522 A1* | 12/2007 | Toba | ...................... | H02M 7/487 363/131 |
| 2008/0304298 A1* | 12/2008 | Toba | ...................... | H02H 7/122 363/56.01 |
| 2011/0062962 A1* | 3/2011 | Wolf | ...................... | G01R 31/64 324/548 |
| 2011/0080147 A1* | 4/2011 | Schoenlinner | .......... | H02M 7/48 323/282 |
| 2011/0194216 A1* | 8/2011 | Schaub | ................ | H02H 7/1222 361/18 |
| 2012/0281443 A1* | 11/2012 | Wolf | ...................... | H02M 7/48 363/55 |
| 2013/0250641 A1* | 9/2013 | Falk | ...................... | H02M 1/36 363/131 |
| 2014/0001838 A1* | 1/2014 | Watanabe | ............... | B60L 50/40 307/9.1 |
| 2014/0015326 A1* | 1/2014 | Eberhardt | ......... | H02M 7/53873 307/82 |
| 2015/0244166 A1* | 8/2015 | Chen | ...................... | H02M 3/24 363/37 |
| 2015/0270788 A1* | 9/2015 | Sawano | ............ | H02M 7/53871 363/98 |
| 2015/0295491 A1* | 10/2015 | Lenz | ...................... | H02M 7/42 323/234 |
| 2016/0261206 A1* | 9/2016 | Ayai | ......................... | H02M 1/14 |
| 2017/0005606 A1* | 1/2017 | Kuroki | ................ | H02M 1/32 |
| 2017/0019027 A1* | 1/2017 | Knobloch | ............... | H02M 1/44 |
| 2017/0313197 A1* | 11/2017 | Yamada | ............ | H02M 7/53871 |
| 2018/0278192 A1* | 9/2018 | Simms | ................ | H02J 7/345 |
| 2020/0014245 A1* | 1/2020 | Costinett | ............ | H02M 7/5387 |
| 2020/0091704 A1* | 3/2020 | Huang | ................ | H02H 7/1213 |
| 2020/0185960 A1* | 6/2020 | Toyoda | ............... | H02M 7/487 |
| 2020/0220470 A1* | 7/2020 | Tsumura | ................ | H02M 5/44 |
| 2020/0287463 A1* | 9/2020 | Ishikawa | ............... | H02M 3/158 |
| 2020/0321852 A1* | 10/2020 | Steiper | .................... | H02M 1/32 |
| 2021/0104955 A1* | 4/2021 | Yamaguchi | ........... | H02M 3/158 |
| 2022/0037992 A1* | 2/2022 | Marxer | ................... | H02M 1/32 |

FOREIGN PATENT DOCUMENTS

| | | |
|---|---|---|
| EP | 2 145 368 A2 | 1/2010 |
| EP | 2 920 858 A2 | 9/2015 |
| JP | 2011067037 A | 3/2011 |

* cited by examiner

INVERTER WITH MONITORING UNIT FOR INTERMEDIATE CIRCUIT PROTECTION

This application is a 35 U.S.C. 371 National Stage application of PCT/EP2019/070441, filed Jul. 30, 2019, and claims priority to European Application No. EP 18186354.9 filed on Jul. 30, 2018. The entire contents of the above-mentioned patent applications are incorporated herein by reference as part of the disclosure of this U.S. application.

The invention relates to a method and a device for protecting an inverter intermediate circuit within an inverter.

Inverters generally serve to convert an existing DC voltage into an AC voltage. This AC voltage may for example be supplied to a power supply network. Inverters may be configured for generating single-phase alternating current or three-phase alternating current or rotary current. A further distinction is made between self-commutated inverters, also known as stand-alone inverters, and externally commutated or line-commutated inverters.

A solar inverter forms part of a solar energy system. On the input side of the solar inverter, there are usually one or more choppers (DC/DC converters), which a microprocessor controls and/or regulates in accordance with the function of a maximum power point tracker and which supply the intermediate circuit. On the output side of the solar inverter, there is a one- to three-phase AC stage, which can synchronise itself with the power supply network automatically. The intermediate circuit forms an electrical device which decouples different converters (DC/DC converters and DC/AC converters) as an energy store. In a DC intermediate circuit, the decoupling takes place by means of intermediate circuit capacitors, at a constant voltage and a variable current.

In this context, capacitors are connected in series if the voltage to be applied is greater than the admissible voltage of a single capacitor. In intermediate circuits, electrolyte capacitors are conventionally used. These electrolyte capacitors are usually available at a nominal voltage of up to approximately 500 V. Usually, in circuit arrangements which provide storage of electrical energy in electrolyte capacitors having voltages over 500 V, two or more electrolyte capacitors are connected in series. Since in solar generators high voltages can occur at the input of the inverter, a plurality of capacitors are connected in series at the intermediate circuit of the inverter for energy buffering at the input.

However, series connection of a plurality of capacitors has the drawback that the desired voltage limit for each capacitor of the intermediate circuit fails if a fault occurs in which one of the capacitors of the intermediate circuit is short-circuited. A short circuit of this type at a capacitor of the intermediate circuit results in the applied input voltage now having to be divided over the remaining capacitors which are as yet not short-circuited. This in turn can lead to an overvoltage and ultimately to a defect in these capacitors within the intermediate circuit.

EP 2 145 368 B1 therefore proposes a circuit arrangement for monitoring the voltage distribution of capacitors connected in series of an inverter intermediate circuit. In this context, a potential divider is provided in parallel with the capacitors of the intermediate circuit and divides the voltage between the two capacitors, a protective diode being arranged in series with a series resistor in parallel with each capacitor, in such a way that the threshold voltage of the protective diode is less than the admissible voltage of the capacitor arranged in parallel with the protective diode, a protective circuit being arranged in parallel with the series resistors.

Therefore, an object of the present invention is to provide a method and a device for protecting an inverter intermediate circuit, in which the circuitry of the intermediate circuit itself is not changed and the complexity of circuitry for protecting the intermediate circuit against overvoltages is as low as possible.

This object is achieved according to the invention by an inverter having the features set out in claim 1.

Accordingly, the invention provides an inverter comprising a DC/DC converter which converts a direct current received from a DC voltage source into an intermediate circuit voltage of an intermediate circuit, a DC/AC converter which converts the intermediate circuit voltage into an AC voltage, and comprising a monitoring unit which monitors capacitors of the intermediate circuit for protection against overvoltages, the overvoltage unit, if an overvoltage occurs at at least one of the capacitors of the intermediate circuit and/or if an asymmetrical voltage distribution of the voltage drops at the capacitors of the intermediate circuit occurs, reducing the energy transmitted from the DC voltage source to the intermediate circuit by actuating the DC/DC converter.

Thus, as a result of the inverter according to the invention, the intermediate circuit included therein is protected against overvoltages by actuating the DC/DC converter already present within the inverter. It is thus unnecessary to change the circuitry of the intermediate circuit included within the inverter.

In one possible embodiment of the inverter according to the invention, the monitoring unit actuates a clocked switch of the DC/DC converter via an actuation logic to protect the intermediate circuit against overvoltages.

In one possible embodiment of the inverter according to the invention, the clocked switch of the DC/DC converter is actuated by the monitoring unit via the actuation logic as soon as an overvoltage is detected at one of the capacitors of the intermediate circuit or an asymmetrical voltage distribution of the voltage drops at the capacitors of the intermediate circuit is detected.

In one possible embodiment of the inverter according to the invention, the monitoring unit actuates the clocked switch of the DC/DC converter if an overvoltage occurs at one of the capacitors of the intermediate circuit or if an asymmetrical voltage distribution of the voltage drops at the capacitors of the intermediate circuit occurs, in such a way that the energy transmitted from the DC voltage source to the intermediate circuit via the DC/DC converter is reduced.

In a further possible embodiment of the inverter according to the invention, the DC/DC converter has a step-up converter circuit, which raises a DC voltage generated by a DC voltage source to a predetermined intermediate circuit voltage of the intermediate circuit.

In a further possible embodiment of the inverter according to the invention, the DC voltage source connected to the DC/DC converter has at least one photovoltaic module.

In a further possible embodiment of the inverter according to the invention, the monitoring unit of the intermediate circuit actuates a clocked boost switch of the step-up converter circuit via the actuation logic if an overvoltage at one of the capacitors of the intermediate circuit and/or an asymmetrical voltage distribution of the voltage drops at the capacitors of the intermediate circuit are detected by the monitoring unit of the inverter.

In a further possible embodiment of the inverter according to the invention, the DC/AC converter of the inverter is connected at the output, via at least one choke and at least one AC relay, to a power supply network.

In a further possible embodiment of the inverter according to the invention, the monitoring unit of the inverter stores the occurrence of an overvoltage at one of the capacitors of the intermediate circuit and/or the occurrence of an asymmetrical voltage distribution of the voltage drops at the capacitors of the intermediate circuit in a store of the monitoring unit and/or activates a protective mode of operation to protect the capacitors of the intermediate circuit against overvoltages.

In a further possible embodiment of the inverter according to the invention, the monitoring unit outputs an error signal via an interface if an overvoltage at one of the capacitors of the intermediate circuit and/or an asymmetrical voltage distribution of the voltage drops at the capacitors of the intermediate circuit are detected by the monitoring unit of the inverter.

In a further possible embodiment of the inverter according to the invention, voltage drops across each of the capacitors connected in series within the intermediate circuit are detected or measured sensorially by means of voltage sensors of the monitoring unit.

In a further possible embodiment of the inverter according to the invention, the intermediate circuit has at least two electrolyte capacitors connected in series.

In a further possible embodiment of the inverter according to the invention, the monitoring unit and the actuation logic are supplied with a supply voltage by the DC voltage source.

In a further possible embodiment of the inverter according to the invention, the monitoring unit has a dedicated power unit which is connected to a power supply network.

A further aspect of the invention provides a method for protecting an inverter intermediate circuit.

Accordingly, the invention provides a method for protecting an inverter intermediate circuit, which is provided for buffering a voltage outputted by a DC/DC converter and which has a plurality of capacitors, the method comprising the following steps:

detecting the respective voltage drops across the capacitors of the intermediate circuit, monitoring whether an overvoltage at one of the capacitors of the intermediate circuit and/or an asymmetrical voltage distribution of the voltage drops at the capacitors of the intermediate circuit are occurring, and reducing the energy transmitted to the intermediate circuit by actuating the DC/DC converter as soon as an overvoltage and/or an asymmetrical voltage distribution are detected.

In one possible embodiment of the method according to the invention, as soon as an overvoltage at one of the capacitors of the intermediate circuit or an asymmetrical voltage distribution of the voltage drops at the capacitors of the intermediate circuit are detected, a clocked switch of the DC/DC converter is actuated in such a way that the energy transmitted from a DC voltage source to the intermediate circuit via the DC/DC converter is reduced.

In one possible embodiment of the method according to the invention, a voltage difference between the voltage drops across the capacitors of the intermediate circuit is detected.

In a further possible embodiment of the method according to the invention, an asymmetrical voltage distribution is detected as soon as the determined voltage difference between the voltage drops across the capacitors of the intermediate circuit exceeds a threshold.

Hereinafter, possible embodiments of the method according to the invention and device according to the invention for protecting an inverter intermediate circuit are described in greater detail with reference to the accompanying drawings, in which.

Figure 1:
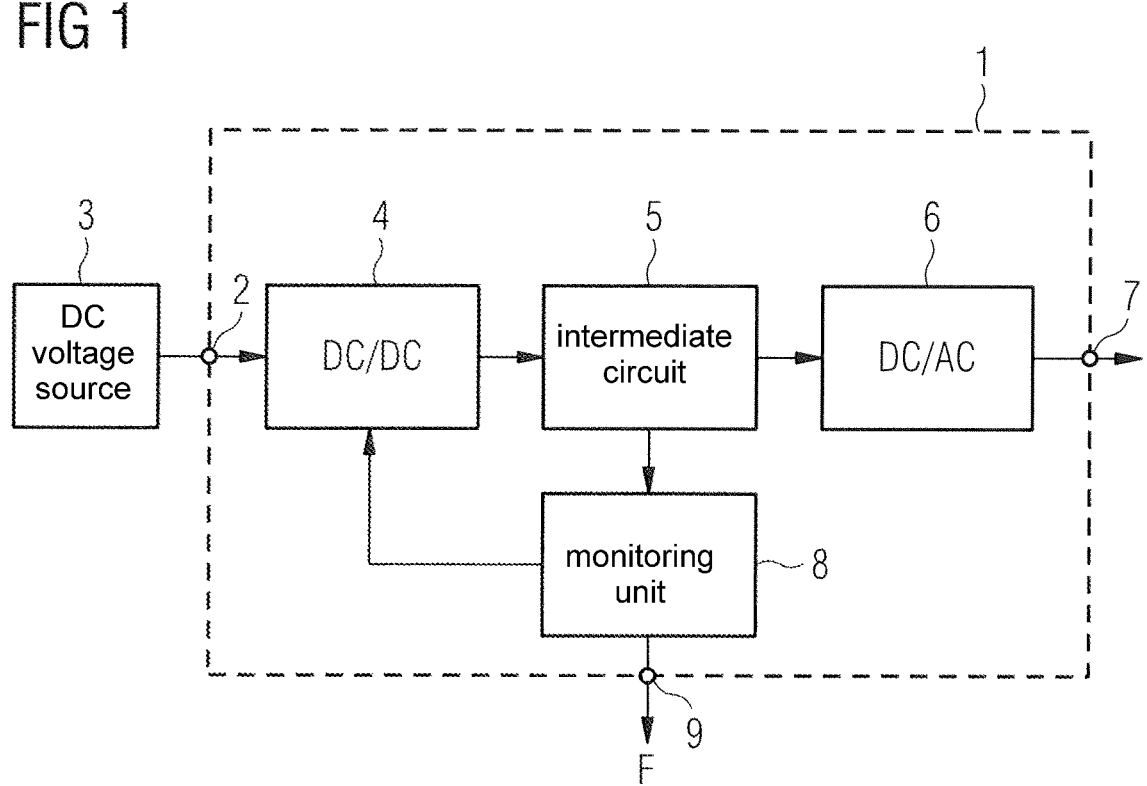
FIG. 1 is a block diagram of an example embodiment of the inverter according to the invention.

FIG. 1 is a block diagram illustrating an embodiment of an inverter 1 according to the invention. The inverter 1 has an input 2, which can be connected to a voltage source 3, which may include at least one photovoltaic module that delivers a DC voltage, or may include a dedicated power unit which is connected to a power supply network. The inverter 1 includes a DC/DC converter 4, which converts the DC voltage obtained from the DC voltage source 3 into an intermediate circuit voltage for an intermediate circuit 5 of the inverter 1. The inverter 1 further includes a DC/AC converter 6, which converts the intermediate circuit voltage of the intermediate circuit 5 into an AC voltage which is outputted at an output 7 of the inverter 1. The inverter 1 has a monitoring unit 8, which is connected to the intermediate circuit 5. The monitoring unit 8 monitors the capacitors of the intermediate circuit 5 to protect the intermediate circuit 5 from overvoltages. If an overvoltage occurs in at least one of the capacitors C of the intermediate circuit 5, the monitoring unit 8 reduces the energy transmitted from the DC voltage source 3 to the intermediate circuit 5 by actuating the DC/DC converter 4, as is schematically shown in FIG. 1.

In one possible embodiment, the intermediate circuit monitoring unit 8 is integrated into a processor.

As soon as the monitoring unit 8 detects an overvoltage at one of the capacitors C of the intermediate circuit 5 and/or an asymmetrical voltage distribution of the voltage drops at the capacitors C of the intermediate circuit 5, the monitoring unit 8 can actuate a clocked switch within the DC/DC converter 4 via an actuation logic 10 in such a way that the energy transmitted from the DC voltage source 3 to the intermediate circuit 5 is reduced. In one possible embodiment, the monitoring unit 8 of the inverter 1 can store the occurrence of an overvoltage at one of the capacitors C of the intermediate circuit 5 and/or the occurrence of an asymmetrical voltage distribution of the voltage drops at the capacitors C of the intermediate circuit 5 in a local store and/or automatically activate a protective mode of operation to protect the capacitors C of the intermediate circuit 5 from overvoltages. In the protective mode of operation, a clocked switch provided within the DC/DC converter 4 is preferably actuated in such a way that the electrical energy transmitted from the DC voltage source 3 to the intermediate circuit 5 via the DC/DC converter 4 is reduced. In this context, the switch is preferably clocked periodically, the transmitted electrical energy being reduced so as to decouple the intermediate circuit 5 from the DC voltage source 3 or to disconnect it for longer within the clock period. In one possible embodiment, the intermediate circuit monitoring unit 8, if an overvoltage at one of the capacitors C of the intermediate circuit 5 occurs or if an asymmetrical voltage distribution of the voltage drops at the capacitors C of the intermediate circuit 5 occurs, automatically generates an error signal F which can be outputted via an interface 9 of the inverter 1. This error signal F can indicate to further control systems within the circuit arrangement that the inverter 1 is now operating in a protective mode of operation. In one possible embodiment of the invention, a plurality of capacitors C are interconnected in series within the intermediate circuit 5. In this context, the voltage drops across each of the capacitors C connected in series within the intermediate circuit 5 is detected sensorially and communicated to the intermediate circuit monitoring unit 8 of the inverter 1. In one possible embodiment, the intermediate circuit 5 has at least two electrolyte capacitors connected in series.

In one possible embodiment of the inverter according to the invention, the intermediate circuit monitoring unit 8 can be supplied with a supply voltage from the input side by the DC voltage source 3. In an alternative embodiment, the monitoring unit 8 or the inverter 1 has a dedicated power unit which is supplied by a power supply network.

Figure 2:
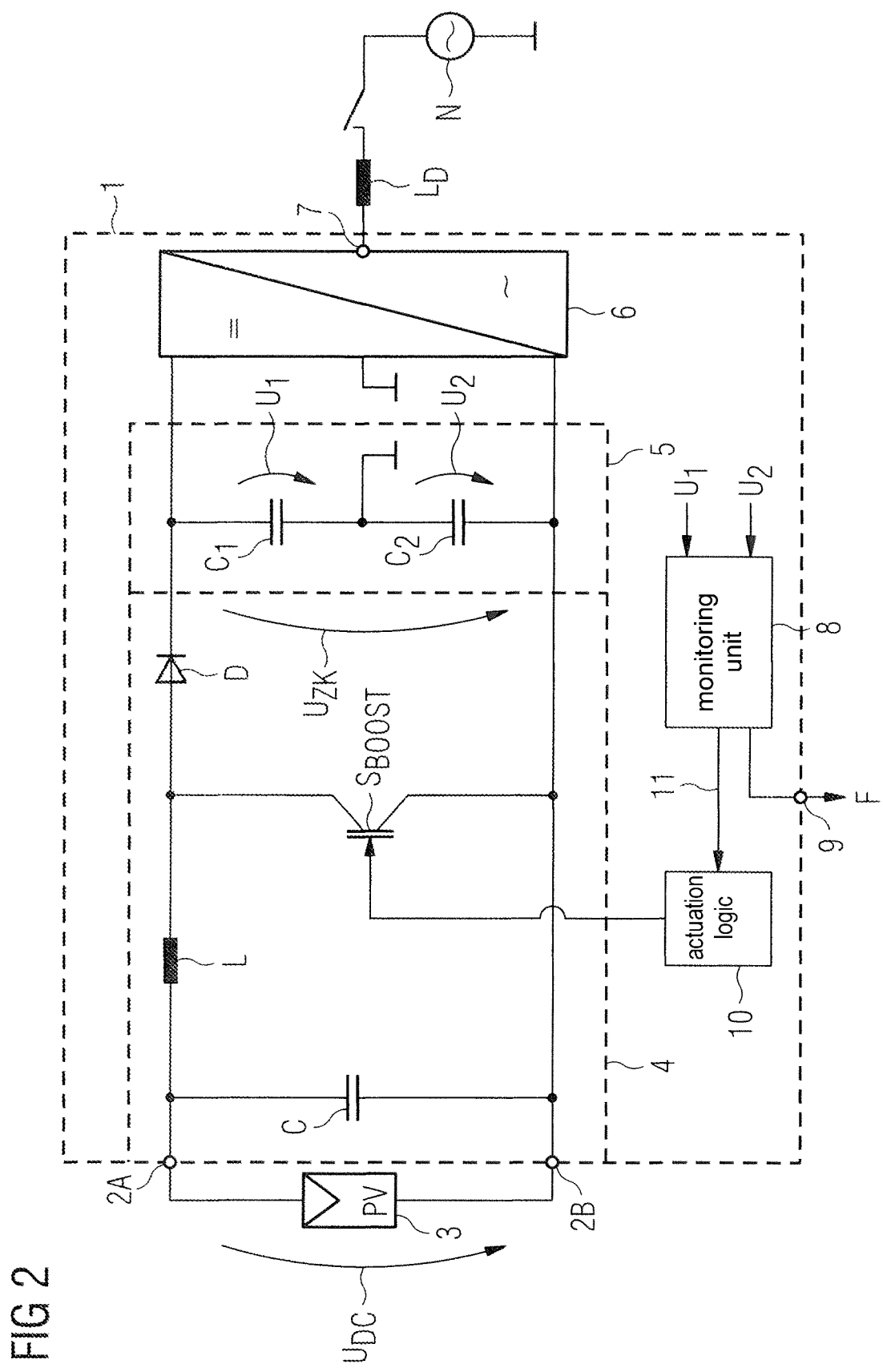
FIG. 2 is a circuit diagram illustrating an embodiment of an inverter according to the invention.

FIG. 2 is a circuit diagram illustrating the functionality of an embodiment of the inverter 1 according to the invention.

In the embodiment shown in FIG. 2, the intermediate circuit 5 includes two capacitors C1, C2 interconnected in series, the respective voltage drops U1, U2 across the two capacitors C1, C2 being monitored by the intermediate circuit monitoring unit 8 of the inverter 1. The intermediate circuit 5 comprising the two capacitors C1, C2 connected in series is connected between a DC/DC converter 4 and a DC/AC converter 6 of the inverter 1. In the embodiment shown in FIG. 2, the DC/DC converter 4 is a step-up converter circuit. This step-up converter circuit raises the DC voltage generated by the DC voltage source 3 to a predetermined intermediate circuit voltage of the intermediate circuit 5. In the embodiment shown in FIG. 2, the DC voltage source connected to the DC/DC converter 4 has at least one photovoltaic module. In the embodiment shown in FIG. 2, the step-up converter circuit 4, which serves as a DC/DC converter stage 4, includes a capacitor C, a coil L, a diode D and an actuable boost switch $S_{Boost}$. The boost switch may for example be an IGBT. This boost switch $S_{Boost}$ is actuated by an actuation logic 10 of the inverter 1 in normal operation. The intermediate circuit monitoring unit 8 provided in the inverter 1 according to the invention actuates the existing actuation logic 10 of the inverter 1 via a control line 11 in such a way that, in the protective mode of operation, in other words if a sensorially detected overvoltage at one of the two capacitors C1, C2 of the intermediate circuit 5 occurs and/or if an asymmetrical voltage distribution of the voltage drops U1, U2 at the capacitors C1, C2 of the intermediate circuit 5 is detected, the clocked boost switch $S_{Boost}$ of the DC/DC converter 4 reduces the electrical energy transmitted to the intermediate circuit 5 by the DC voltage source 3 via the DC/DC stage 4 so as to protect the intermediate circuit 5. In the embodiment shown in FIG. 2, the circuitry of the DC/DC stage 4 or step-up converter circuit itself is not changed. In the inverter 1 according to the invention, the boost switch $S_{Boost}$ already present in the DC/DC converter 4 is used for additionally protecting the intermediate circuit 5 against overvoltages in a protective mode of operation of the inverter 1. If for example a defect occurs at the DC/AC stage 6 of the inverter 1, this can lead to an asymmetrical voltage distribution of the voltage drops U1, U2 at the capacitors C1, C2 of the intermediate circuit 5 or to a local overvoltage at one of the capacitors C of the intermediate circuit 5. In one possible embodiment, the intermediate circuit monitoring unit 8 may determine a voltage difference ΔU between the voltage drops U1 and U2 across the capacitors C1, C2 of the intermediate circuit 5. In this context, the modulus of the voltage difference ΔU is sufficient.

$$\Delta U = |U_1 - U_2|$$

An asymmetrical voltage distribution is automatically detected as soon as the determined voltage difference ΔU between the voltage drops across the capacitors C of the intermediate circuit 5 exceeds a threshold:

$$\Delta U \geq U_{Diffmax}$$

In this case, the intermediate circuit monitoring unit 8 of the actuation logic 10 of the boost switch $S_{Boost}$ can display the need to protect the intermediate circuit 5, in such a way that the actuation logic 10 now actuates the boost switch $S_{Boost}$ actuated thereby in such a way that the electrical energy transmitted to the intermediate circuit 5 by the DC voltage source 3 is reduced. This preferably takes place by way of a change in a clock ratio ($T_{on}/(T_{on}+T_{off})$) of the actuation signal, generated by the actuation logic 10, of the boost switch $S_{Boost}$. This prevents the capacitors C, in particular the electrolyte capacitors of the intermediate circuit 5, from being loaded beyond the rated voltage thereof. As a result of the intermittently clocked short-circuiting of the photovoltaic modules or photovoltaic cell strings, the voltage capacity of the electrolyte capacitors within the intermediate circuit 5 is not exceeded. This is the case because the capacitors are not charged during the short circuit. In one possible embodiment, starting from when the overvoltage occurs or is detected, the boost switch $S_{Boost}$ of the DC/DC stage 4 is actuated in such a way that the energy transmission from the DC voltage source 3 into the intermediate circuit 5 is reduced. This actuation of the boost switch or IGBT [of] the DC/DC stage 4 is thus still achieved while the inverter 1 continues to operate in the protective mode of operation. In the embodiment shown in FIG. 2, the DC/AC switch 6 of the inverter 1 is connected, at the output, to a power supply network N via at least one choke LD and at least one AC relay.

In one possible embodiment, the DC/AC stage 6 has a multilevel circuit topology. The two capacitors C1, C2 are for example 500 volt capacitors which provide an open-circuit voltage of 1000 V.

Figure 3:
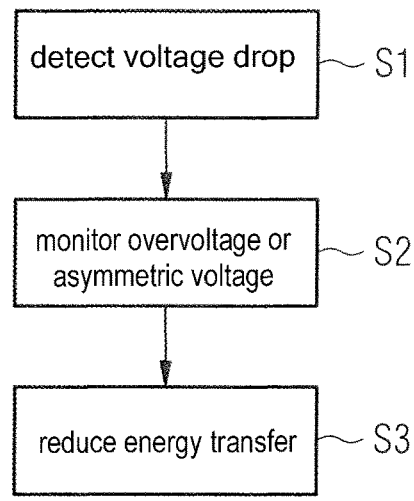
FIG. 3 is a flow chart illustrating an embodiment of a method according to the invention for protecting an inverter intermediate circuit.

FIG. 3 is a flow chart illustrating an embodiment of the method according to the invention for protecting an inverter intermediate circuit which is provided for buffering a voltage dependent on a DC/DC converter and which has a plurality of capacitors.

In the embodiment shown in FIG. 3, the method for protecting the inverter intermediate circuit basically has three main steps.

In a first step S1, the respective voltage drops U across the capacitors C of the intermediate circuit are detected sensorially.

In a further step S2, it is monitored whether an overvoltage at one of the capacitors C of the intermediate circuit and/or an asymmetrical voltage distribution of the voltage drops at the capacitors C of the intermediate circuit is occurring.

In a further step S3, the energy transmitted to the intermediate circuit is reduced by actuating the Dc/DC converter as soon as an overvoltage and/or an asymmetrical voltage distribution has been detected in step S2.

This preferably takes place in that a clocked switch within the DC/DC converter is actuated in such a way that the electrical energy transmitted to the intermediate circuit by a DC voltage source via the DC/DC converter is reduced.

In one possible embodiment of the method according to the invention, in step S2 a voltage difference ΔU between the voltage drops across the capacitors C of the intermediate circuit is determined or calculated. As soon as the calculated voltage difference ΔU between the voltage drops across the capacitors of the intermediate circuit exceeds a threshold, in step S2 an asymmetrical voltage distribution is detected, and triggers decoupling of the intermediate circuit from the DC voltage source or reduction of the transmitted energy by actuation of the DC/DC converter in step S3.

The method shown in FIG. 3 may for example be carried out by a processor or microprocessor. The intermediate circuit monitoring unit 8 preferably forms part of a processor of this type. The intermediate circuit monitoring unit 8 shown in FIG. 2 can be integrated into the actuation logic 10.

Figure 4A:
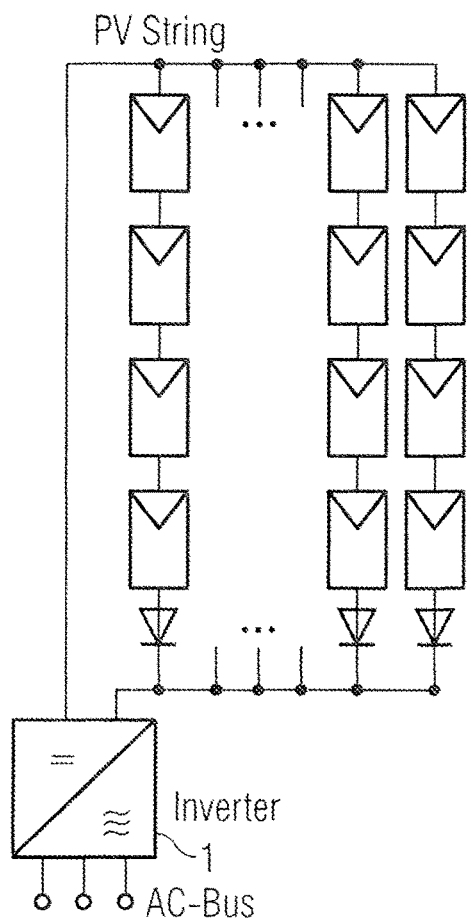
FIGS. 4a, 4b are circuit diagrams illustrating possible example applications of an inverter according to the invention.
Figure 4B:
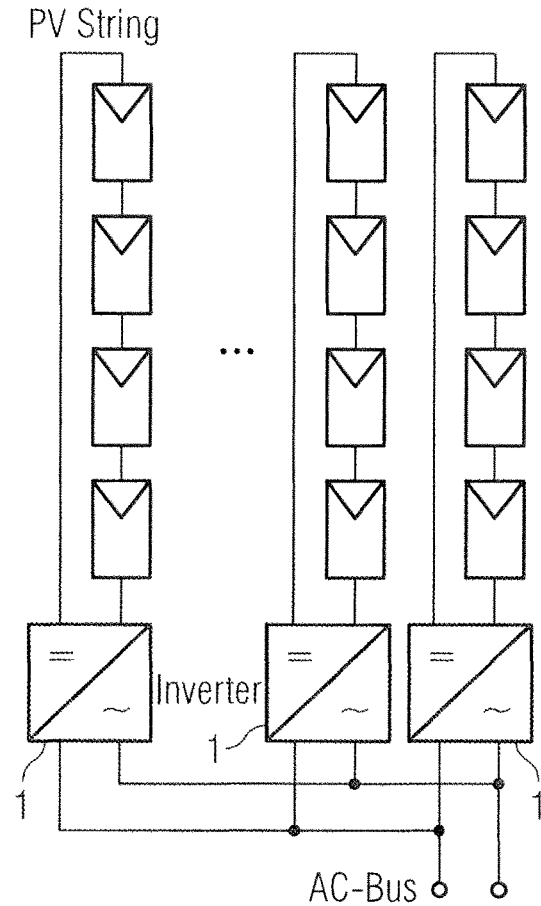

FIGS. 4a, 4b show example applications for an inverter 1 according to the invention [comprising] integrated circuit protection for protecting the intermediate circuit included therein. FIG. 4a shows the connection of an inverter as a central inverter for a field of photovoltaic cell strings. FIG. 4b shows an application of the inverter 1 according to the invention for an associated photovoltaic string.

In the embodiment shown in FIG. 1, 2, the intermediate circuit monitoring unit 8 is preferably located within a housing of the inverter 1. Alternatively, the intermediate monitoring unit 8 may also be integrated into a remote control system, which is connected to the inverter 1 via a control interface. In one possible embodiment, the plurality of different inverters 1 are monitored via a central control system. In one possible embodiment, the various inverters 1 may report a switchover to the protective mode of operation to a central control system of the system. In the embodiment shown in FIG. 2, the DC/DC stage 4 is formed by a boost circuit or step-up converter circuit, the connected DC voltage source 3 being short-circuited intermittently in a clocked manner so as to reduce the transmitted energy. Alternatively, a buck circuit may also be used as a DC stage. The complexity of circuitry to be provided for the method according to the invention and the device according to the invention is minimal, since circuitry components already present within the inverter 1 are used for the protective operation.

When the asymmetry/overvoltage is detected, an AC relay or an additional power source (for example a battery) may additionally be switched off.

The invention claimed is:

1. An inverter comprising:
    a DC/DC converter configured to convert a direct current received from a DC voltage source into an intermediate circuit voltage of an intermediate circuit,
    a DC/AC converter configured to convert the intermediate circuit voltage into an AC voltage, and
    a monitoring unit configured to monitor a plurality of capacitors of the intermediate circuit for protection against overvoltages, the monitoring unit further configured to reduce energy transmitted from the DC voltage source to the intermediate circuit by actuating the DC/DC converter when an overvoltage occurs at one of the plurality of capacitors of the intermediate circuit or when an asymmetrical voltage distribution of voltage drops at the plurality of capacitors of the intermediate circuit occurs,
    wherein the plurality of capacitors of the intermediate circuit are connected in series, and
    wherein the DC/DC converter includes a clocked switch that is clocked periodically in such a way that the energy transmitted from the DC voltage source to the intermediate circuit is reduced to reduce energy transmitted from the DC voltage source to the intermediate circuit when the overvoltage occurs at one of the plurality of capacitors of the intermediate circuit or when the asymmetrical voltage distribution of voltage drops at the plurality of capacitors of the intermediate circuit occurs,
    wherein the clocking of the clocked switch of the DC/DC converter is maintained even when the overvoltage or the asymmetrical voltage distribution is detected,
    wherein the DC/DC converter includes a step-up converter circuit that is configured to raise a DC voltage generated by the DC voltage source to a predetermined intermediate circuit voltage of the intermediate circuit, in which the step-up converter circuit includes the clocked switch,
    wherein the monitoring unit is configured to actuate the clocked switch of the step-up converter circuit via an actuation logic when the overvoltage at one of the plurality of capacitors of the intermediate circuit or the asymmetrical voltage distribution of the voltage drops at the plurality of capacitors of the intermediate circuit is detected by the monitoring unit, and
    wherein the DC/AC converter is connected at an output thereof, via at least one choke and at least one AC relay, to a power supply network.

2. The inverter according to claim 1, wherein the DC voltage source connected to the DC/DC converter includes at least one photovoltaic module.

3. The inverter according to claim 1, wherein the monitoring unit is configured to store an occurrence of the overvoltage at one of the plurality of capacitors of the intermediate circuit and to store an occurrence of the asymmetrical voltage distribution of the voltage drops at the plurality of capacitors of the intermediate circuit in a store of the monitoring unit or to activate a protective mode of operation of the inverter to protect the plurality of capacitors of the intermediate circuit against overvoltages.

4. The inverter according to claim 1, wherein the monitoring unit is configured to output an error signal via an interface when the overvoltage at one of the plurality of capacitors of the intermediate circuit or the asymmetrical voltage distribution of the voltage drops at the plurality of capacitors of the intermediate circuit is detected by the monitoring unit.

5. The inverter according to claim 1, wherein the monitoring unit includes voltage sensors configured to measure the voltage drops across each of the plurality of capacitors.

6. The inverter according to claim 1, wherein the plurality of capacitors of the intermediate circuit includes at least two electrolyte capacitors connected in series.

7. The inverter according to claim 1, wherein the monitoring unit and the actuation logic are supplied by the DC voltage source or include a dedicated power unit which is connected to the power supply network.

8. The inverter according to claim 1, wherein the monitoring unit is further configured to determine a voltage difference between the voltage drops across the plurality of capacitors of the intermediate circuit.

9. A method for protecting an intermediate circuit of an inverter, the intermediate circuit is provided for buffering a voltage outputted by a DC/DC converter and which has a plurality of capacitors, and the inverter includes a monitoring unit and a DC/AC converter configured to convert an intermediate circuit voltage into an AC voltage, the method comprising the following steps:

(a) detecting voltage drops across the plurality of capacitors of the intermediate circuit;
(b) monitoring, by the monitoring unit, whether an overvoltage at one of the plurality of capacitors of the intermediate circuit or an asymmetrical voltage distribution of the voltage drops at the plurality of capacitors of the intermediate circuit is occurring; and
(c) reducing energy transmitted from a DC voltage source to the intermediate circuit by actuating the DC/DC converter when the overvoltage or the asymmetrical voltage distribution is detected,
wherein the DC/DC converter includes a clocked switch that is clocked periodically in such a way that the energy transmitted from the DC voltage source to the intermediate circuit is reduced when reducing energy transmitted from the DC voltage source to the intermediate circuit and when the overvoltage or the asymmetrical voltage distribution is detected,
wherein the clocking of the clocked switch of the DC/DC converter is maintained even when the overvoltage or the asymmetrical voltage distribution is detected,
wherein the DC/DC converter includes a step-up converter circuit that is configured to raise a DC voltage generated by the DC voltage source to a predetermined intermediate circuit voltage of the intermediate circuit, in which the step-up converter circuit includes the clocked switch,
wherein the monitoring unit is configured to actuate the clocked switch of the step-up converter circuit via an actuation logic when the overvoltage at one of the plurality of capacitors of the intermediate circuit or the asymmetrical voltage distribution of the voltage drops at the plurality of capacitors of the intermediate circuit is detected by the monitoring unit, and
wherein the DC/AC converter is connected at an output thereof, via at least one choke and at least one AC relay, to a power supply network.

10. The method according to claim 9, wherein the asymmetrical voltage distribution is detected when a determined voltage difference between the voltage drops across the plurality of capacitors of the intermediate circuit exceeds a voltage threshold.

11. The method according to claim 9, wherein the plurality of capacitors of the intermediate circuit are connected in series and the monitoring step includes determining a voltage difference between the voltage drops across the plurality of capacitors of the intermediate circuit.

\* \* \* \* \*